(12) United States Patent
Kellmereit et al.

(10) Patent No.: US 11,663,617 B2
(45) Date of Patent: May 30, 2023

(54) DYNAMIC FILE GENERATION SYSTEM

(71) Applicant: SAP SE, Walldorf (DE)

(72) Inventors: Jan Kellmereit, Zwingenberg (GR); Ralph Moessner, Pfinztal (DE)

(73) Assignee: SAP SE, Walldorf (DE)

( * ) Notice: Subject to any disclaimer, the term of this patent is extended or adjusted under 35 U.S.C. 154(b) by 360 days.

(21) Appl. No.: 16/733,597

(22) Filed: Jan. 3, 2020

(65) Prior Publication Data
US 2021/0209626 A1 Jul. 8, 2021

(51) Int. Cl.
G06Q 30/00 (2023.01)
G06Q 30/0202 (2023.01)
G06F 16/16 (2019.01)

(52) U.S. Cl.
CPC ....... G06Q 30/0202 (2013.01); G06F 16/164 (2019.01); G06F 16/168 (2019.01)

(58) Field of Classification Search
CPC .......... G06Q 30/0202; G06Q 10/0631; G06Q 10/06395; G06Q 10/00; G06Q 10/02; G06Q 10/06; G06Q 10/10; G06Q 30/02; G06F 16/164; G06F 16/168; G06F 3/04817; G05B 2219/31357
See application file for complete search history.

(56) References Cited

U.S. PATENT DOCUMENTS

| | | | | |
|---|---|---|---|---|
| 2002/0099596 A1* | 7/2002 | Geraghty | ........... | G06Q 30/0204 705/7.33 |
| 2011/0301926 A1* | 12/2011 | Chussil | .............. | G06Q 30/0201 703/6 |
| 2013/0060603 A1* | 3/2013 | Wagner | .............. | G06Q 30/0202 705/7.29 |
| 2013/0282445 A1* | 10/2013 | Chussil | .............. | G06Q 10/0637 705/7.37 |
| 2014/0172504 A1* | 6/2014 | Duva | ...................... | H04M 3/51 705/7.31 |
| 2014/0280193 A1* | 9/2014 | Cronin | ................ | G06F 16/2453 707/741 |

(Continued)

OTHER PUBLICATIONS

Gavish, Bezalel, and Olivia R. Liu Sheng. "Dynamic file migration in distributed computer systems." Communications of the ACM 33.2 (1990): 177-189. (Year: 1990).*

Primary Examiner — Robert D Rines
Assistant Examiner — Jay-Ming Wang
(74) Attorney, Agent, or Firm — Schwegman Lundberg & Woessner, P.A.

(57) ABSTRACT

Systems and methods are provided for receiving a request for forecasting data to use for new product introduction, the request comprising an indication of a plurality of existing products and accessing data for a plurality of existing curves corresponding to the plurality of existing products. The systems and methods further provide for, based on determining that at least a subset of curves of the plurality of curves comprises a plurality of values, analyzing each value of the plurality of values for each curve of the subset of curves to determine a maximum number of values among all of the curves of the subset of curves, generating a text file comprising a maximum number of value columns corresponding to the maximum number of values, and populating the text file with the data for the plurality of existing curves, including the plurality of values for each curve of the subset of curves.

20 Claims, 10 Drawing Sheets

(56) References Cited

U.S. PATENT DOCUMENTS

2016/0019564 A1* 1/2016 Ouyang ........... G06Q 10/06315
                                                      705/7.31
2016/0217400 A1* 7/2016 Sit .................... G06Q 10/06311
2016/0217401 A1* 7/2016 Leung .............. G06Q 10/06311
2016/0350721 A1* 12/2016 Comerford ........... H04L 67/306
2017/0006135 A1* 1/2017 Siebel ...................... G06N 5/01

* cited by examiner

| < | Manage Product Lifecycle ▼ | | | | | | |
|---|---|---|---|---|---|---|---|
| test2* ▼ | Search | | | | | | |
| Planning Area: | Product ID: | Reference Product ID: | Status: | | Customer Region: | | |
| WDFSAP6PRO ▼ | [ ] 🔍 | [ ] | [ ] | | [ ] | | |

Product Assignments (609) | Product Assignments | Forecast Dates

| | Product ID | Product Desc | Reference Product ID | Reference Product Desc | Weight in % | Valid From | Valid To | Offset of Days in the Past | Status |
|---|---|---|---|---|---|---|---|---|---|
| ☐ | HT_002 | CleverTale 48inch silver | HT_002 | CleverTale 48inch silver | 50 | | | 365 | Active > |
| ☐ | HT_006 | M-Phone 3DS 128GB ultrablack&chrome | HT_006 | M-Phone 3DS 128GB | 100 | | | 0 | Active > |
| ☐ | | | HT_007 | C-Phone 9 black | 50 | | | 30 | Active > |
| ☐ | | | HT_008 | C-Phone 9SE white | 50 | | | 60 | Active > |
| ☐ | HT_007 | C-Phone 9 black | HT_001 | CleverTale 42inch white | 100 | | | 0 | Active > |
| ☐ | | | HT_003 | SharpColor 3D 48inch black | 100 | | | 0 | Active > |
| ☐ | | | HT_004 | SharpColor 3D Ultra 50inch black | 20 | | | 0 | Active > |

FIG. 4

| NAME | CURVETYPE | STARTVALUE | ENDVALUE | FUNCTION | NUMBEROF | VALUE1 | VALUE2 | VALUE3 |
|---|---|---|---|---|---|---|---|---|
| 1231231321 | 1 | 60.00 | 95.00 | 3 | 30 | | | |
| 123456 | 1 | 10.00 | 190.00 | 8 | 12 | | | |
| 123456new | 1 | 50.00 | 190.00 | 5 | 14 | | | |
| A flexible curve | 1 | 0.00 | 0.00 | 8 | 14 | 20.00 | 10.00 | 0.00 |
| AUNIT20190621094642 | 1 | 0.00 | 0.00 | 8 | 15 | 20.00 | 100.00 | 5.00 |
| AUNIT20190621145756 | 1 | 42.00 | 43.00 | 8 | 9 | 42.00 | 80.00 | 30.00 |
| AUNIT20190719150901 | 1 | 56.00 | 57.00 | 8 | 9 | 56.00 | 80.00 | 30.00 |
| AUNIT201930162007 | 1 | 1.00 | 2.00 | 8 | 9 | 10.00 | 80.00 | 30.00 |
| AUNIT20190830075015 | 1 | 7.00 | 8.00 | 8 | 9 | 10.00 | 80.00 | 30.00 |
| AUNIT20190830080552 | 1 | 15.00 | 16.00 | 8 | 9 | 10.00 | 80.00 | 30.00 |
| AUNIT20190830081047 | 1 | 52.00 | 53.00 | 8 | 9 | 10.00 | 80.00 | 30.00 |
| AUNIT20190830081911 | 1 | 47.00 | 48.00 | 8 | 9 | 10.00 | 80.00 | 30.00 |
| AUNIT20190916133913 | 1 | 11.00 | 12.00 | 8 | 9 | 10.00 | 80.00 | 30.00 |
| AUNIT20190916143814 | 1 | 13.00 | 14.00 | 8 | 9 | 10.00 | 80.00 | 30.00 |
| AUNIT20190916171957 | 1 | 14.00 | 15.00 | 8 | 9 | 10.00 | 80.00 | 30.00 |

FIG. 6

| | PRODUCT | DIMENSION2 | DIMENSION3 | REFERENCE_PRODUCT | WEIGHT | PERIOD_OFFSET | IS_ACTIVE | STARTDATE | ENDDATE |
|---|---|---|---|---|---|---|---|---|---|
| 1 | | | | | | | | | |
| 2 | HT_002 | | | HT_002 | 50 | 365 | X | 0 | 0 |
| 3 | HT_006 | | | HT_006 | 100 | 0 | X | 0 | 0 |
| 4 | HT_006 | | | HT_007 | 50 | 30 | X | 0 | 0 |
| 5 | HT_006 | | | HT_008 | 50 | 60 | X | 0 | 0 |
| 6 | HT_007 | | | HT_001 | 100 | 0 | X | 0 | 0 |
| 7 | HT_007 | | | HT_003 | 100 | 0 | X | 0 | 0 |
| 8 | HT_007 | | | HT_004 | 20 | 0 | X | 0 | 0 |
| 9 | HT_008 | | | HT_002 | 80 | 0 | X | 0 | 0 |
| 10 | HT_008 | | | HT_004 | 100 | 0 | X | 0 | 0 |
| 11 | HT_009 | | | HT_004 | 85 | 0 | X | 20180101 | 20180531 |
| 12 | HT_009 | | | HT_021 | 15 | 0 | X | 20170101 | 20171231 |
| 13 | HT_010 | | | HT_011 | 50 | 0 | X | 20171111 | 20180403 |
| 14 | HT_010 | | | HT_012 | 50 | 0 | X | 20180404 | 20180731 |
| 15 | HT_010 | | | HT_016 | 100 | 0 | X | 0 | 0 |
| 16 | HT_011 | | | HT_011 | 10 | 0 | X | 0 | 0 |

FIG. 8

DYNAMIC FILE GENERATION SYSTEM

BACKGROUND

Demand planning aims to create a forecast for future demand of a product. This can be done using sophisticated statistical algorithms that calculate a future time series with the knowledge of past values. For new products, however, such past values, which include the number of sold items of the product in the past, do not exist.

BRIEF DESCRIPTION OF THE DRAWINGS

Various ones of the appended drawings merely illustrate example embodiments of the present disclosure and should not be considered as limiting its scope.

FIGS. 4-8 illustrate example user interfaces, according to some example embodiments.

DETAILED DESCRIPTION

Figure 1:
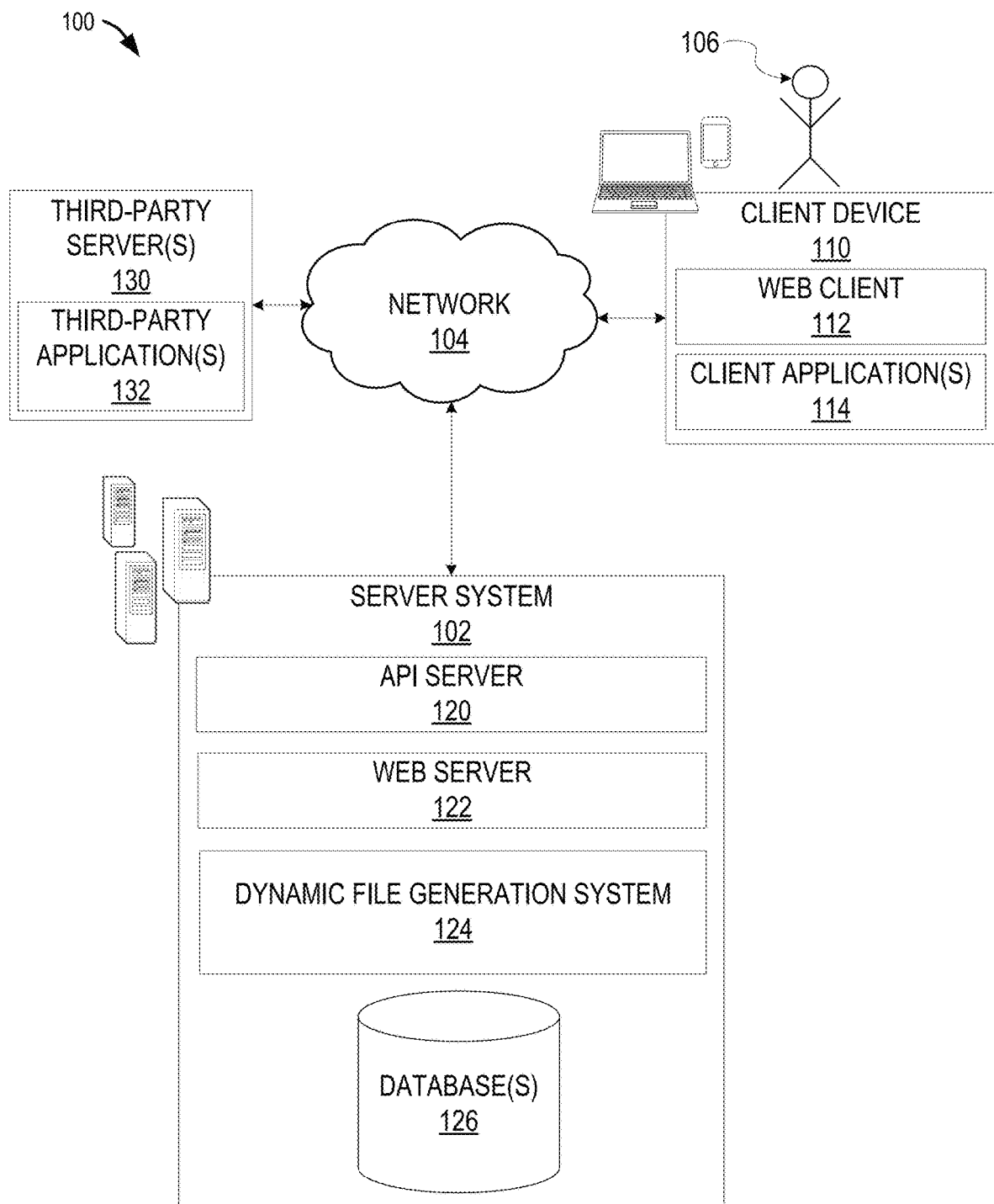
FIG. 1 is a block diagram illustrating a networked system, according to some example embodiments.

Systems and methods described herein relate to dynamic file generation. As indicated above, forecasting a future demand for a new product introduction cannot be done using past values for the new product, because there are no past values yet for the new product. For instance, a product to be introduced into the market or very recently introduced in the market does not yet have historical data. Example embodiments allow a user to define references to existing products to use for new products that have no historical data. Thus, example embodiments allow a user to use planning data from existing products which are estimated to be similar to new products and planning algorithms can generate planning data for new products.

Example embodiments provide functionality to manage a product lifecycle. For example, phase-in and phase-out curves can be used to steer the expected demand of a new product. To reflect a curve in the system, several data points are needed along with administrative values of a curve (e.g., start value, end value, offset, valid from, valid to, curve assignment). These attributes and data points, however, are not easy to define by a user. For example, it would not be manually possible to go through historical data (such as hundreds of curves with numerous values) in a system for even one similar existing product. Example embodiments analyze historical data for existing products to dynamically generate a file comprising all phase-in and phase-out curves (for example) in the system. A user can view the generated file and make any desired edits and then save the generated file comprising a plurality of curves (e.g., phase-in and/or phase-out curves) for the new product. The generated file can be opened with any standard application, such as a spreadsheet application (e.g., Excel).

For example, example embodiments comprise a backend controller to determine a maximum number of data points for all curves which are currently in a system for existing products in a planning area (e.g., products that are estimated to be similar to the new product). The determined maximum number of data points is used to set a maximum column size for a file to be generated with data for the existing products. Since many curves are flexible curves that have a varying number of data values, a maximum number of data points is determined to generate the appropriate number of columns to populate in the generated file. After that, the controller analyzes requested fields and an individual file (e.g., CSV file) is generated. The content of the generated file is dynamically compared with requested paging (e.g., if a front-end request has a paging number of 500, the controller ensures that all dependencies of the 500 values in the backend system are considered). Further, the content of the generated file can be enriched from additional data read from backend tables. Also, at this point the controller can consider all dependencies. Once the controller finishes generating and populating the file, the file can be sent to a front-end device to be accessed and displayed by a user.

Example embodiments provide a file that can be easily accessed by users to change or create new entities and upload a final file into a system for new product introduction. Since the file is dynamically created and contains enriched business data, it brings a high value to a user since all needed data is collected and placed in one file. Moreover, example embodiments provide for more accurate forecasting for new products.

FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other computing or communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user 106 that is used to access and utilize cloud services, among other applications.

One or more users 106 may be a person, a machine, or other means of interacting with the client device 110. In example embodiments, the user 106 may not be part of the system 100 but may interact with the system 100 via the client device 110 or other means. For instance, the user 106 may provide input (e.g., touch screen input or alphanumeric input) to the client device 110 and the input may be communicated to other entities in the system 100 (e.g., third-party servers 130, server system 102, etc.) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a search engine, a messaging application, an electronic mail (email) application, an e-commerce site application, a mapping or location application, an enterprise resource planning (ERP) application, a customer relationship management (CRM) application, an analytics design application, a new product lifecycle or forecasting application, and the like.

In some embodiments, one or more client applications 114 may be included in a given client device 110, and configured to locally provide the user interface and at least some of the functionalities, with the client application(s) 114 configured to communicate with other entities in the system 100 (e.g., third-party servers 130, server system 102, etc.), on an as-needed basis, for data and/or processing capabilities not locally available (e.g., access location information, access software version information, access an ERP system, access a CRM system, access an analytics design system, access data to respond to a search query, to authenticate a user 106, to verify a method of payment, access test data, access to historical product data, and so forth). Conversely, one or more applications 114 may not be included in the client device 110, and then the client device 110 may use its web browser to access the one or more applications hosted on other entities in the system 100 (e.g., third-party servers 130, server system 102, etc.).

A server system 102 may provide server-side functionality via the network 104 (e.g., the Internet or wide area network (WAN)) to one or more third-party servers 130 and/or one or more client devices 110. The server system 102 may include an application program interface (API) server 120, a web server 122, and a dynamic file generation system 124 that may be communicatively coupled with one or more databases 126.

The one or more databases 126 may be storage devices that store data related to users of the system 100, applications associated with the system 100, cloud services, and so forth. The one or more databases 126 may further store information related to third-party servers 130, third-party applications 132, client devices 110, client applications 114, users 106, and so forth. In one example, the one or more databases 126 may be cloud-based storage.

The server system 102 may be a cloud computing environment, according to some example embodiments. The server system 102, and any servers associated with the server system 102, may be associated with a cloud-based application, in one example embodiment.

The dynamic file generation system 124 may provide back-end support for third-party applications 132 and client applications 114, which may include cloud-based applications. The dynamic file generation system 124 generates dynamic files from historical product data, as described in further detail below. The dynamic file generation system 124 may comprise one or more servers or other computing devices or systems.

The system 100 further includes one or more third-party servers 130. The one or more third-party servers 130 may include one or more third-party application(s) 132. The one or more third-party application(s) 132, executing on third-party server(s) 130, may interact with the server system 102 via API server 120 via a programmatic interface provided by the API server 120. For example, one or more the third-party applications 132 may request and utilize information from the server system 102 via the API server 120 to support one or more features or functions on a website hosted by the third party or an application hosted by the third party. The third-party website or application 132, for example, may provide access to historical product data and dynamic file generation and corresponding functionality that is supported by relevant functionality and data in the server system 102.

Figure 2:
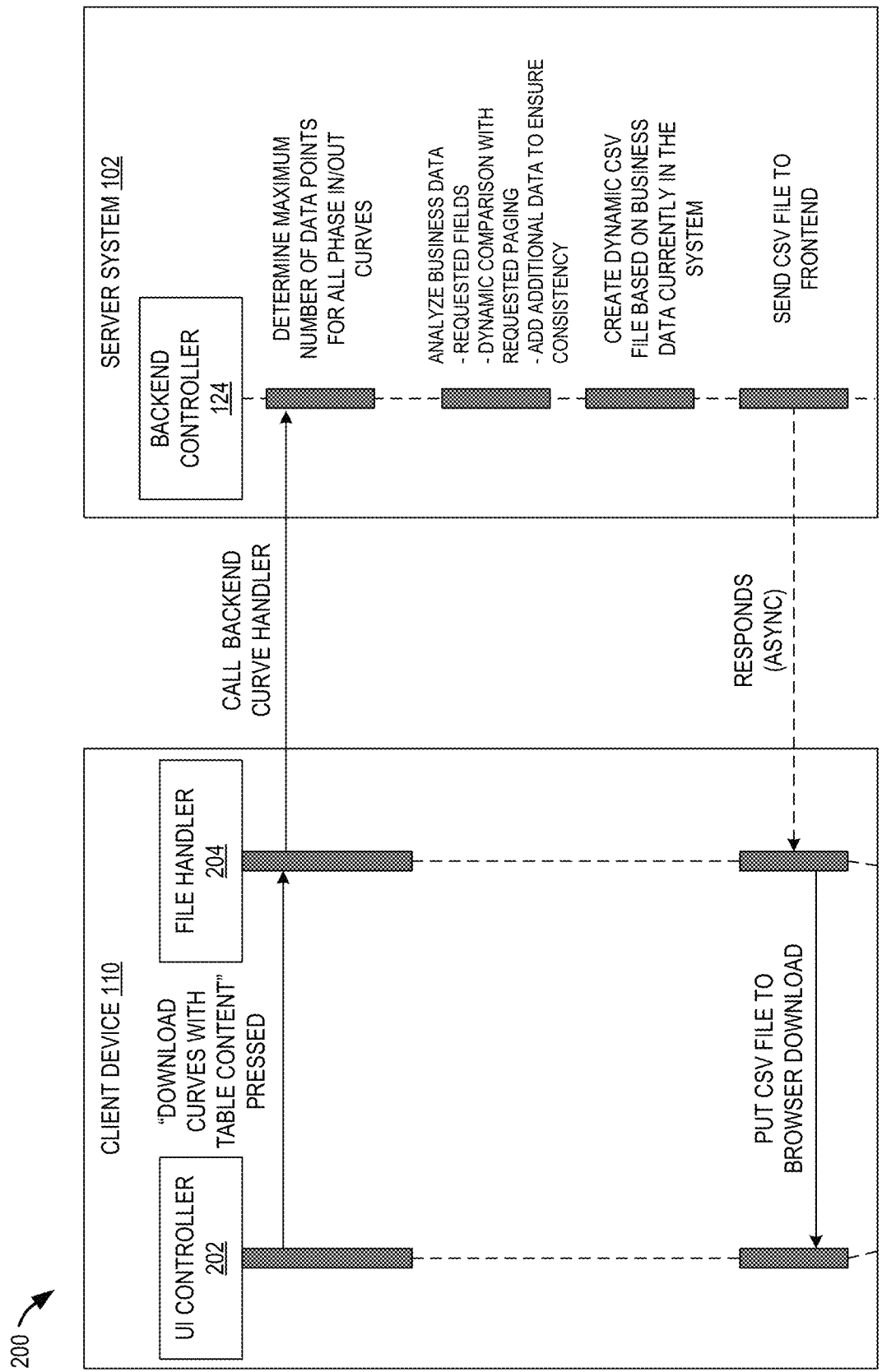
FIG. 2 is an example sequence diagram of a process to dynamically generate a comma-separated values (CSV file), according to some example embodiments.

FIG. 2 is an example sequence diagram 200 of a process to dynamically generate a CSV file (or similar). The diagram illustrates components and operations on the client device 110 and the server system 102 of FIG. 1, and the interactions between the client device 110 and the server system 102.

A user interface (UI) controller 202 provides functionality for generating graphical user interfaces (GUI) to be displayed on a display of the client device 110, and functionality for processing inputs made by a user via the client device 110 (e.g., data entry, interaction with the GUI (e.g., via a touch display or input device) such as via a menu or icon). The UI controller 202 further provides functionality to communicate with a file handler 204.

The file handler 204 provides functionality to communicate with server system 102. For example, the file handler 204 can communicate requests and data to the server system 102, receive responses and data from the server system 102, and the like. For example, the UI controller 202 detects a user input to request a CSV file with data from existing products (e.g., data corresponding to curves, such as phase-in and phase-out curves). The UI controller 202 sends the request, and any associated data, to the file handler 204. The file handler 204 calls the backend curve handler (in this example), by communicating with the backend controller 124 of the server system 102. The backend controller 124 of FIG. 2 corresponds to the dynamic file generation system 124 of FIG. 1 and is thus labeled using the same reference number.

The backend controller 124 receives the request for the CSV file and any associated data. In the example where the request is for curve data for existing products, the backend controller 124 determines a maximum number of data points for all phase-in and phase-out curves, analyzes the business data and creates a dynamic CSV file based on the business data currently in the system. Analyzing the business data may comprise requested fields which can be user requested fields such as filter values (e.g., specific products, specified region, specified product status), type of download data, parameters (e.g., separator), type of download data (e.g., curves, including table content).

Analyzing the business data may also comprise dynamic comparison with requested paging. For example, a UI may only display a specified number of values at a time (e.g., 20) and then when scrolling down, the next 20 results are shown. When generating a CSV file, the backend controller 124 generates the file for all fields (e.g., 54), and not just the first 20 values. Analyzing the business data may also comprise adding additional data to ensure consistency. For example, more information (e.g., technical information, administrative data) may be included in the CSV file than what is displayed in the UI.

The backend controller 124 sends the CSV file to the client device 110 in response to the request. The file handler 204 receives the request and provides the CSV file to the UI controller 202. The user can then access and view the CSV file via a GUI generated by the UI controller 202. Further details of the process are described below with respect to FIG. 3.

Figure 3:
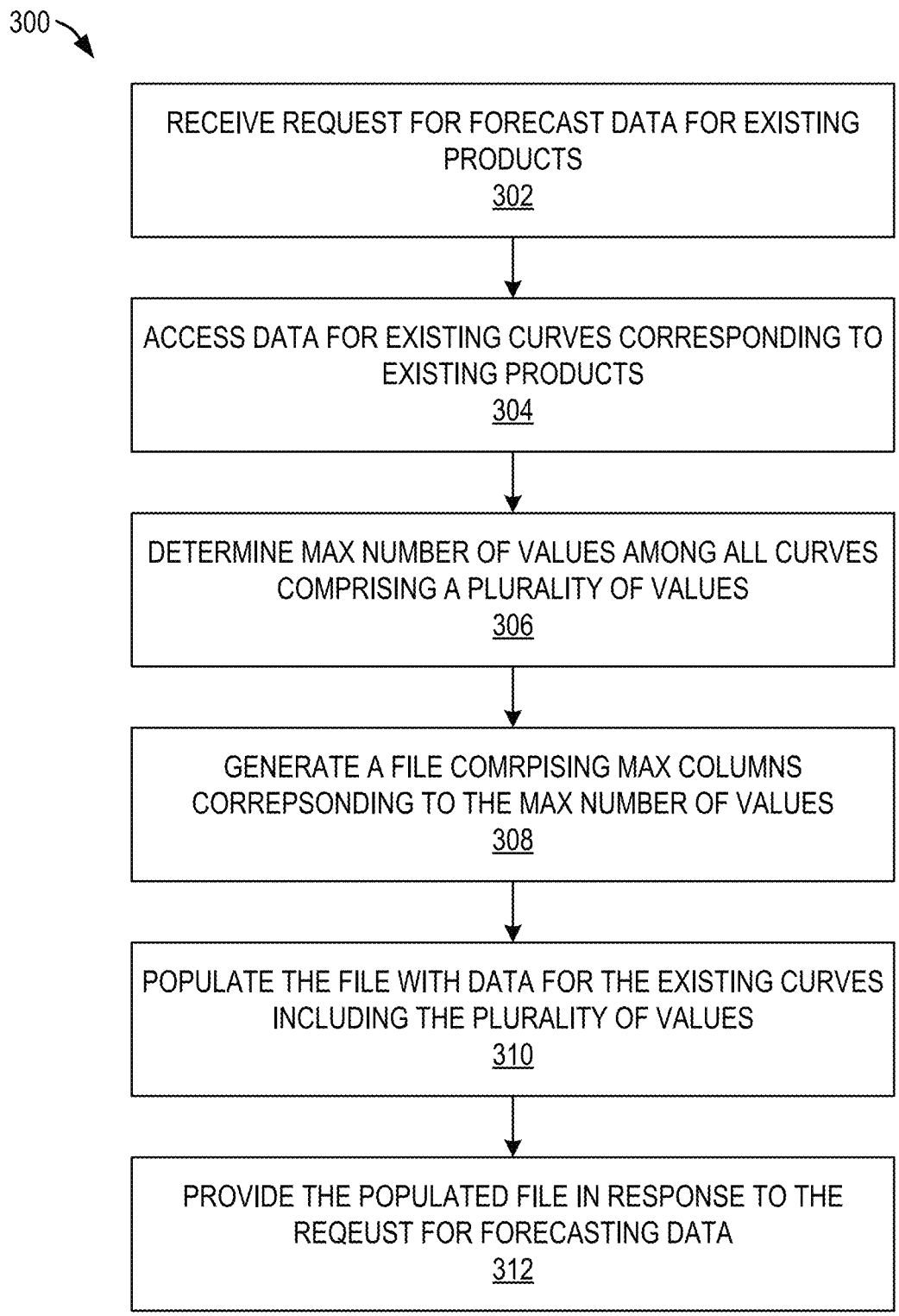
FIG. 3 is a flow chart illustrating aspects of a method for dynamic file generation, according to some example embodiments.

FIG. 3 is a flow chart illustrating aspects of a method 300 for dynamic file generation, according to some example embodiments. For illustrative purposes, method 300 is described with respect to the networked system 100 of FIG. 1 and sequence diagram of FIG. 2. It is to be understood that method 300 may be practiced with other system configurations in other embodiments.

In operation 302, a computing system (e.g., server system 102 or dynamic file generation system 124) receives, from a computing device (e.g., client device 110 or via third-party server 130), a request for historical data (e.g., forecasting data) for existing products. For example, a user may want to request data for existing products to use for a new product introduction. In one example, the request includes an indication of one or more products of a plurality of existing products. In one example the indication is a planning area, as described below. In another example, the indication is a list of specified products, as also described below. Accordingly, the request can comprise identification of a plurality of existing products, and in one embodiment, the identification of the plurality of existing products can be based on an indication of a planning area (e.g., a selection or entry of a planning area).

In one example embodiment, the computing system causes a GUI to display on the computing device that allows a user to request the historical data for existing products. FIG. 4 illustrates an example GUI 400 for requesting a file comprising historical data for existing products to be used for forecasting data (for example) for a new product. The GUI 400 has several input fields 402-410 to allow a user to specify the historical data desired. For example, input field 402 allows a user to select or input a planning area. A planning area is a defined subset of products, for example by product type or product line. For example, a planning area can be a product type or category, such as shampoo, yogurt, cars, TVs, computer monitors, and so forth. A product line can be a particular line of product, such as a high-end line of computer monitors, a particular type of tablet or laptop, and so forth, indicating a generation of a particular product line.

Input field 404 allows a user to input a particular product identifier (ID), for example, the product ID for the new product. Input field 406 allows a user to input one or more specific reference product IDs, such as, for example, specific products that are determined to be similar to the new product.

Input field 408 allows a user to specify a status for the reference product or products in the planning area (e.g., active or inactive), and input field 410 allows a user to specify a geographical region (e.g., Asia, Europe, North America). In other examples, the user can also enter a weight for each product, a valid-to date, a valid-from date, and any offset of days in the past (not shown).

Figure 5:
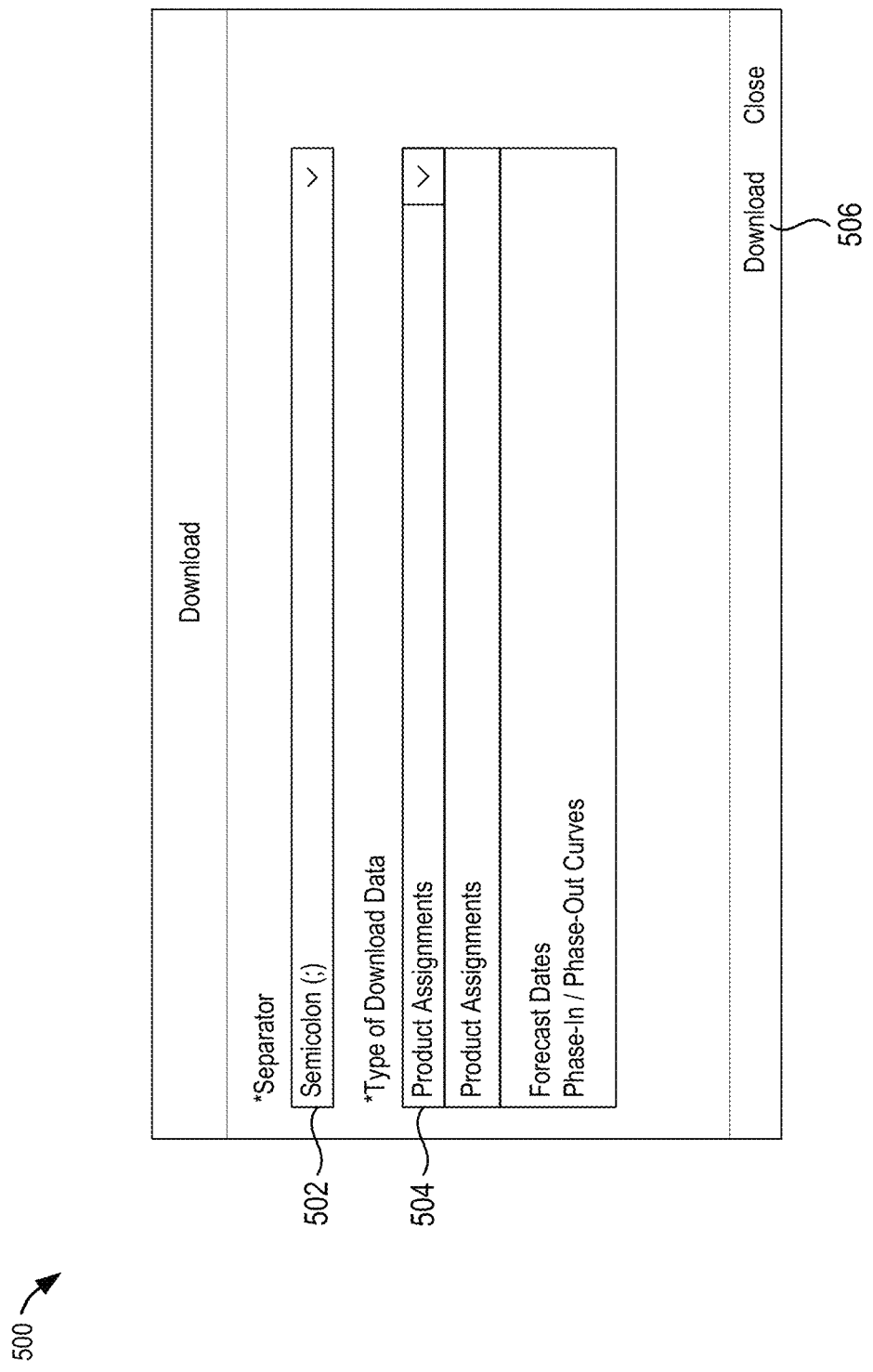

In this example, the user has entered WDFSAP6PRO as the planning area and has not provided any further input (e.g., filters via input fields 404-410). Thus, the computing system causes all the products in the planning area WDFSAP6PRO to be displayed in a list 412 in the GUI 400 on the computing device. The user can then select to download a file with historical data for the products in the list 412. In response, the computing device causes a GUI to display, such as the example GUI 500 of FIG. 5.

The GUI 500 includes an input field 502 for inputting or selecting a separator (e.g., semicolon, colon, comma, or another separator) for the file that will be generated. In one example, the file that will be generated is a comma-separated values (CSV) file. It is to be understood that any file standard can be generated. For example, any text file with separators to distinguish values in the file can be generated.

The GUI 500 further includes an input field 504 for inputting or selecting a type of data that the user desires to download. In this example, the selection includes three types of data: products assignments (e.g., data for specified reference products), forecast dates (e.g., launch curve start and end dates defining start and end points of a phase-in and phase-out process), and curves (e.g., phase-in and phase-out curves).

The GUI 500 further includes an input field 506 for the user to select to download the CSV file. The computing device sends a request to the computing system (e.g., server system 102 or dynamic file generation system 124) to request the historical data for existing products, and the computing system receives the request, as explained above.

In one example, the user selects/requests to download data related to curves (e.g., forecasting curves such as phase-in and phase-out curves). Returning to FIG. 3, in operation 304, the computing system accesses data for a plurality of existing curves corresponding to the plurality of existing products. For example, the computing system accesses one or more data stores (e.g., database(s) 126, a data store associated with third-party server 130) to access the data for the plurality of existing curves corresponding to the plurality of existing products. As explained above, the existing products may be all products in a planning area, or user-specified products. In one example embodiment, the plurality of existing curves each comprise at least one value corresponding to planning data for a respective existing product.

To generate the requested file (e.g., CSV file) the computing system determines whether there are any curves of the plurality of existing curves that comprise a plurality of values (e.g., whether any of the plurality of curves comprises more than one value corresponding to respective planning data for the respective existing product). For example, there may be many types of curves included in the data for the existing products. For example, one type of curve may be a linear function (e.g., starting by 10% and ending by 80%) that does not have any specific values. In another example, the type of curve may be a flexible curve in which a number of values are stored. If the computing system determines that there are one or more curves that comprise a plurality of values, the computing system will have to do further analysis to generate the requested file. If, however, the data only comprises linear or other functions that do not comprise any values, the computing system does not have to do further analysis and can instead simply extract the data for the curves and populate the requested file with the extracted data.

In operation 306, the computing system determines that at least one or a subset of curves of the plurality of curves comprises a plurality of values (e.g., at least a subset of curves comprise more than one value corresponding to the respective planning data for the respective existing product). Based on this determination, the computing system determines a maximum number of values among all curves comprising a plurality of values, in operation 306. For example, there may be 40 flexible curves or other curves with a number of values stored for each curve. The computing system analyzes the data for each curve to compute a number of values for each curve. For example, a first curve may comprise 15 values (or data points) for the curve, a second curve may comprise 29 values, a third curve may comprise 8 values, a fourth curve may comprise 45 values, and so forth. The computing system determines the curve with the maximum values (e.g., 45 in the example above). The computing system then uses the number of values (e.g., 45) as the maximum number among all curves. The computing system can then set the maximum number of value columns for the requested file to the maximum number among all curves (e.g., 45).

In operation 308, the computing system generates a file (e.g., a text file) comprising a maximum number of value columns corresponding to the maximum number of values. The file can have more columns depending on other predefined values for the file, such as a name of curve, a curve type, a start value, an end value, a function, and so forth. Accordingly, the computing system knows how many columns total need to be created for the file based on the predefined columns and the identified number of value columns.

In operation 310, the computing device populates the file with the data for the plurality of existing curves, including the plurality of values for each curve of the curves with values. For example, the computing system extracts data for each curve and populates the predefined and value columns (if applicable) with the extracted data. For instance, the computing system populates the text file with the data of the subset of curves including the at least one value corresponding to the respective planning data for the respective existing product, for each curve of the subset of curves.

The computing device can provide the populated file to the requesting computing device, in operation 312. The computing device causes a displayable version of the populated file to be displayed on a display of the computing device. For example, a user can use any standard application, such as Excel, to open the populated file (e.g., CSV file) to display the data of the populated file. FIG. 6 illustrates an example GUI 600 that displays the data related to curves for existing products in a specified planning area. The GUI 600 displays a number of columns 602. For example, a NAME column indicating the name of each curve, a CURVETYPE column indicating the type of curve (e.g., 1=PhaseInCurve, 2=PhaseOutCurve), a STARTVALUE column indicating the start value for the curve, an ENDVALUE column indicating the end value for the curve, a FUNCTION indicating a function for the curve, a NUMBEROFPERIODS indicating the length of a curve that can be downloaded, and then a number of values columns (e.g., VALUE1, VALUE2, VALUE3, VALUE4) to include the values for the curves with values.

The GUI 600 further displays a number of rows 604, each row indicating a different curve. The example populated file shown in FIG. 6 has been shortened to fit in a page and so all the value columns and all the actual rows are not shown. The number of value columns corresponds to the maximum number of values of all curves with values (e.g., flexible curves), as explained above.

The GUI 600 enables editing of the populated text file. For example, a user can make edits to the text in the GUI 600 (e.g., editing a number value, editing a name of a function), add one or more new curves, and so forth. The user can then save the populated file as forecast data for the new product. The computing device may send the updated populated file (or original populated file if no changes are made) to the computing system. The computing system receives the edits made to the file (or updated or original file) and saves the file as forecasting data for the new product. In another example, the updated or original populated file is saved to the computing device or other computing system.

Figure 7:
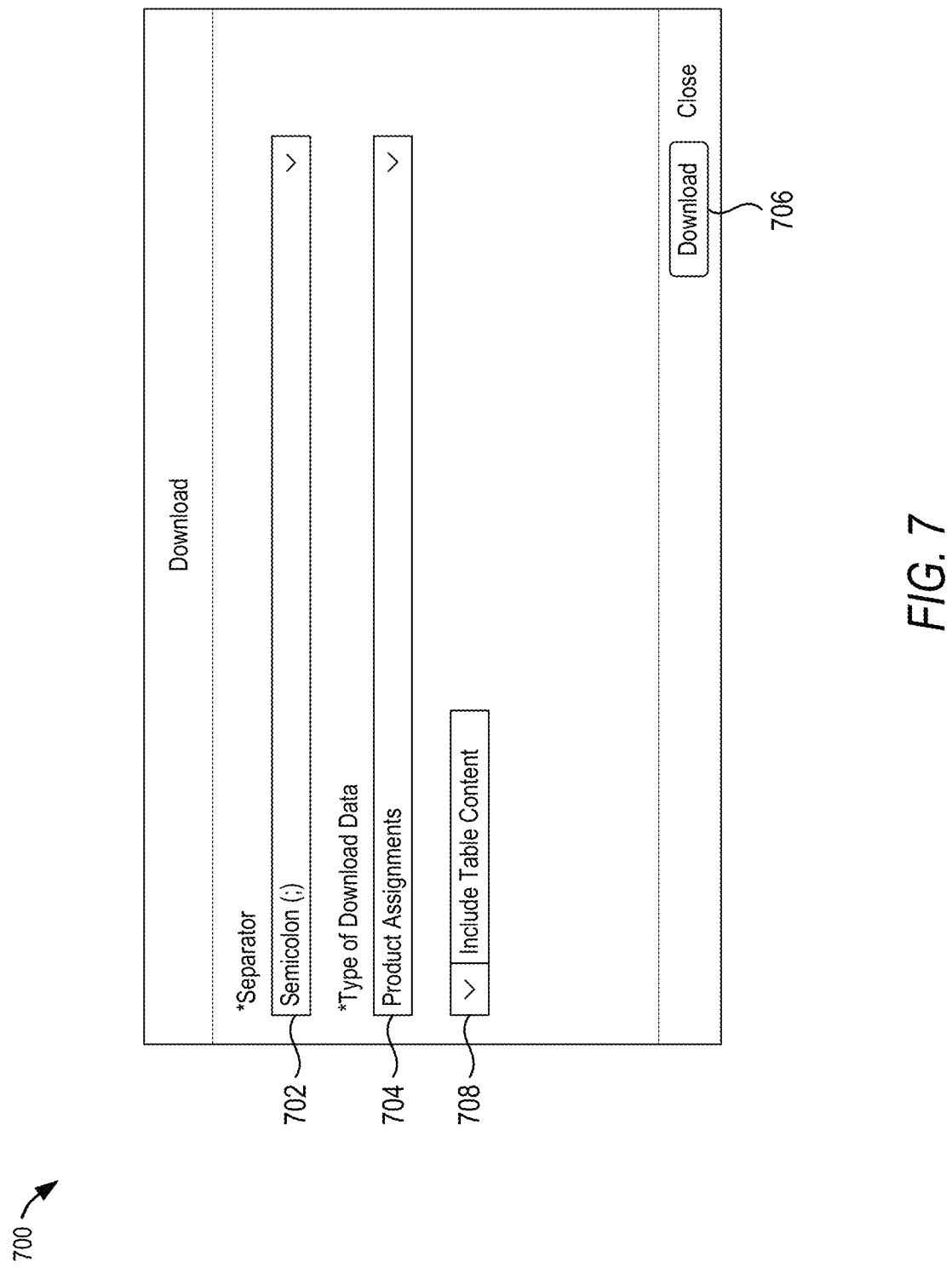

As explained above, a user can also request to download product assignments (e.g., data for specified reference products), as explained above with respect to FIG. 5. FIG. 7 illustrates an example GUI 700 that a computing device causes to display on a display of the computing device.

The GUI 700 includes an input field 702 for inputting or selecting a separator (e.g., semicolon, colon, comma, or another separator) for the file that will be generated, as described above. The GUI 700 further includes an input field 704 for inputting or selecting a type of data that the user desires to download. In this example, the GUI 700 indicates that the user selects products assignments (e.g., data for specified reference products). The GUI 700 further includes an input field 708 for a user to select to include table contents and an input field 706 for the user to select to download the CSV file. The computing device sends a request to the computing system (e.g., server system 102 or dynamic file generation system 124) to request the historical data for existing products and the computing system receives the request, as explained above.

The computing system receives the request for existing product data to use for the new product introduction (e.g., reference existing product data). The request may include an indication of a plurality of existing products (e.g., a planning area or specified products), as explained above. The request may also include at least one of a weight, a start date, and an end date for each existing product of the plurality of existing products. In one example, the weight corresponds to a percent of sales of the existing product that can be used for the new product (e.g., 80% of sales for product two will be used for product one). The offset corresponds to the timing of the data. For example, the user may not want user data for the current year for an existing product, but instead user data for the year before. Thus, the user can specify a 365-day offset, for example. The start date and end date correspond to a valid-from and valid-to date for the data.

The computing system accesses data corresponding to the plurality of existing products. For example, the computing system accesses one or more data stores (e.g., database(s) 126, a data store associated with third-party server 130) to access the data for the plurality of existing curves corresponding to the plurality of existing products. As explained above, the existing products may be all products in a planning area, or user-specified products.

The computing system extracts, for each existing product, reference data for the plurality of existing products, based on any specified weight, start date, and end date. The computing system generates a text file for the reference data and populates the generated text file with the reference data and any specified weight, start date, and end date. The computing system provides the populated text file to the computing device, as also explained above.

The computing device causes a displayable version of the populated file to be displayed on a display of the computing device. For example, as explained above, a user can use any standard application, such as Excel, to open the populated file (e.g., CSV file) to display the data of the populated file. FIG. 8 illustrates an example GUI 800 that displays the data related to existing products 804 in a specified planning area.

The GUI 800 displays a number of columns 802. For example, a PRODUCT column indicating a product name or identifier, a DIMENSTIONS2 and DIMENSIONS3 column indicating a product dimension (e.g., product assignments can be done on a product level or on a product dimension level (e.g., product dimension 1 level, product dimension 3 level) and users can configure an assignment level per planning area according to the need, a REFERENCE_PRODUCT column indicating a reference product corresponding to the new product, a WEIGHT column indicating a weight for the product, a PERIOD_OFFSET column indicating an period offset, an IS_ACTIVE column indicating whether the assignment of the reference to the new product is active or inactive, and a start date and an end date column indicating starting and ending dates.

The following examples describe various embodiments of methods, machine-readable media, and systems (e.g., machines, devices, or other apparatus) discussed herein.

Example 1. A computer-implemented method comprising:
receiving a request from a first computing device for forecasting data to use for a new product introduction, the request comprising identification of a plurality of existing products;
accessing data for a plurality of existing curves corresponding to the plurality of existing products, each existing curve of the plurality of existing curves comprising at least one value corresponding to planning data for a respective existing product;
determining whether any curve of the plurality of existing curves comprises more than one value corresponding to respective planning data for the respective existing product;
based on determining that at least a subset of curves of the plurality of curves comprises more than one value corresponding to the respective planning data for the respective existing product, analyzing each value for each curve of the subset of curves to determine a maximum number of values among all of the curves of the subset of curves;
generating a text file comprising a maximum number of value columns corresponding to the maximum number of values;
populating the text file with the data for the subset of curves of the plurality of existing curves, including the at least one value corresponding to the respective planning data for the respective existing product, for each curve of the subset of curves; and
providing the populated text file to the first computing device.

Example 2. A computer-implemented method according to Example 1, wherein the populated text file is displayed on a display of the first computing device.

Example 3. A computer-implemented method according to any of the previous examples, wherein the display of the first computing device comprises a graphical user interface enabling editing of the populated text file.

Example 4. A computer-implemented method according to any of the previous examples, further comprising:
receiving, from the first computing device, edits made to the text file;
saving the text file in a data store as forecasting data for the new product.

Example 5. A computer-implemented method according to any of the previous examples, wherein the edits comprise changes made to one or more values of the plurality of values in the subset of curves.

Example 6. A computer-implemented method according to any of the previous examples, wherein the edits comprise addition of at least one new curve to the plurality of existing curves.

Example 7. A computer-implemented method according to any of the previous examples, further comprising:
receiving a second request from the first computing device for reference existing product data to use for the new product introduction, the second request comprising an indication of a plurality of existing products and at least one of a weight, a start date, and an end date for each existing product of the plurality of existing products;
accessing the data for the plurality of existing products;
extracting, for each existing product, reference data from the data for the plurality of existing products, based on a specified weight, start date, and end date;
generating a text file for the reference data and populating the generated text file with the reference data and any specified weight, start date, and end date; and
providing the populated text file to the first computing device.

Example 8. A computer-implemented method according to any of the previous examples, wherein the populated text file is a character separated text file.

Example 9. A computer-implemented method according to any of the previous examples, wherein the character is a comma, a semi-colon, or a colon.

Example 10. A system comprising:
a memory that stores instructions; and
one or more processors configured by the instructions to perform operations comprising:
receiving a request from a first computing device for forecasting data to use for a new product introduction, the request comprising identification of a plurality of existing products;
accessing data for a plurality of existing curves corresponding to the plurality of existing products, each existing curve of the plurality of existing curves comprising at least one value corresponding to planning data for a respective existing product;
determining whether any curve of the plurality of existing curves comprises more than one value corresponding to respective planning data for the respective existing product;
based on determining that at least a subset of curves of the plurality of curves comprises more than one value corresponding to the respective planning data for the respective existing product, analyzing each value for each curve of the subset of curves to determine a maximum number of values among all of the curves of the subset of curves;
generating a text file comprising a maximum number of value columns corresponding to the maximum number of values;
populating the text file with the data for the subset of curves of the plurality of existing curves, including the at least one value corresponding to the respective planning data for the respective existing product, for each curve of the subset of curves; and
providing the populated text file to the first computing device.

Example 11. A system according to any of the previous examples, wherein the populated text file is displayed on a display of the first computing device.

Example 12. A system according to any of the previous examples, wherein the display of the first computing device comprises a graphical user interface enabling editing of the populated text file.

Example 13. A system according to any of the previous examples, the operations further comprising:

receiving, from the first computing device, edits made to the text file;

saving the text file in a data store as forecasting data for the new product.

Example 14. A system according to any of the previous examples, wherein the edits comprise changes made to one or more values of the plurality of values in the subset of curves.

Example 15. A system according to any of the previous examples, wherein the edits comprise addition of at least one new curve to the plurality of existing curves.

Example 16. A system according to any of the previous examples, the operations further comprising:

receiving a second request from the first computing device for reference existing product data to use for the new product introduction, the second request comprising an indication of a plurality of existing products and at least one of a weight, a start date, and an end date for each existing product of the plurality of existing products;

accessing the data for the plurality of existing products;

extracting, for each existing product, reference data from the data for the plurality of existing products, based on a specified weight, start date, and end date;

generating a text file for the reference data and populating the generated text file with the reference data and any specified weight, start date, and end date; and providing the populated text file to the first computing device.

Example 17. A system according to any of the previous examples, wherein the populated text file is a character separated text file.

Example 18. A system according to any of the previous examples, wherein the character is a comma, a semi-colon, or a colon.

Example 19. A non-transitory computer-readable medium comprising instructions stored thereon that are executable by at least one processor to cause a computing device to perform operations comprising:

receiving a request from a first computing device for forecasting data to use for a new product introduction, the request comprising identification of a plurality of existing products;

accessing data for a plurality of existing curves corresponding to the plurality of existing products, each existing curve of the plurality of existing curves comprising at least one value corresponding to planning data for a respective existing product;

determining whether any curve of the plurality of existing curves comprises more than one value corresponding to respective planning data for the respective existing product;

based on determining that at least a subset of curves of the plurality of curves comprises more than one value corresponding to the respective planning data for the respective existing product, analyzing each value for each curve of the subset of curves to determine a maximum number of values among all of the curves of the subset of curves;

generating a text file comprising a maximum number of value columns corresponding to the maximum number of values;

populating the text file with the data for the subset of curves of the plurality of existing curves, including the at least one value corresponding to the respective planning data for the respective existing product, for each curve of the subset of curves; and providing the populated text file to the first computing device.

Example 20. A non-transitory computer-readable medium according to any of the previous examples, the operations further comprising:

receiving a second request from the first computing device for reference existing product data to use for the new product introduction, the second request comprising an indication of a plurality of existing products and at least one of a weight, a start date, and an end date for each existing product of the plurality of existing products;

accessing the data for the plurality of existing products;

extracting, for each existing product, reference data from the data for the plurality of existing products, based on a specified weight, start date, and end date;

generating a text file for the reference data and populating the generated text file with the reference data and any specified weight, start date, and end date; and providing the populated text file to the first computing device.

Figure 9:
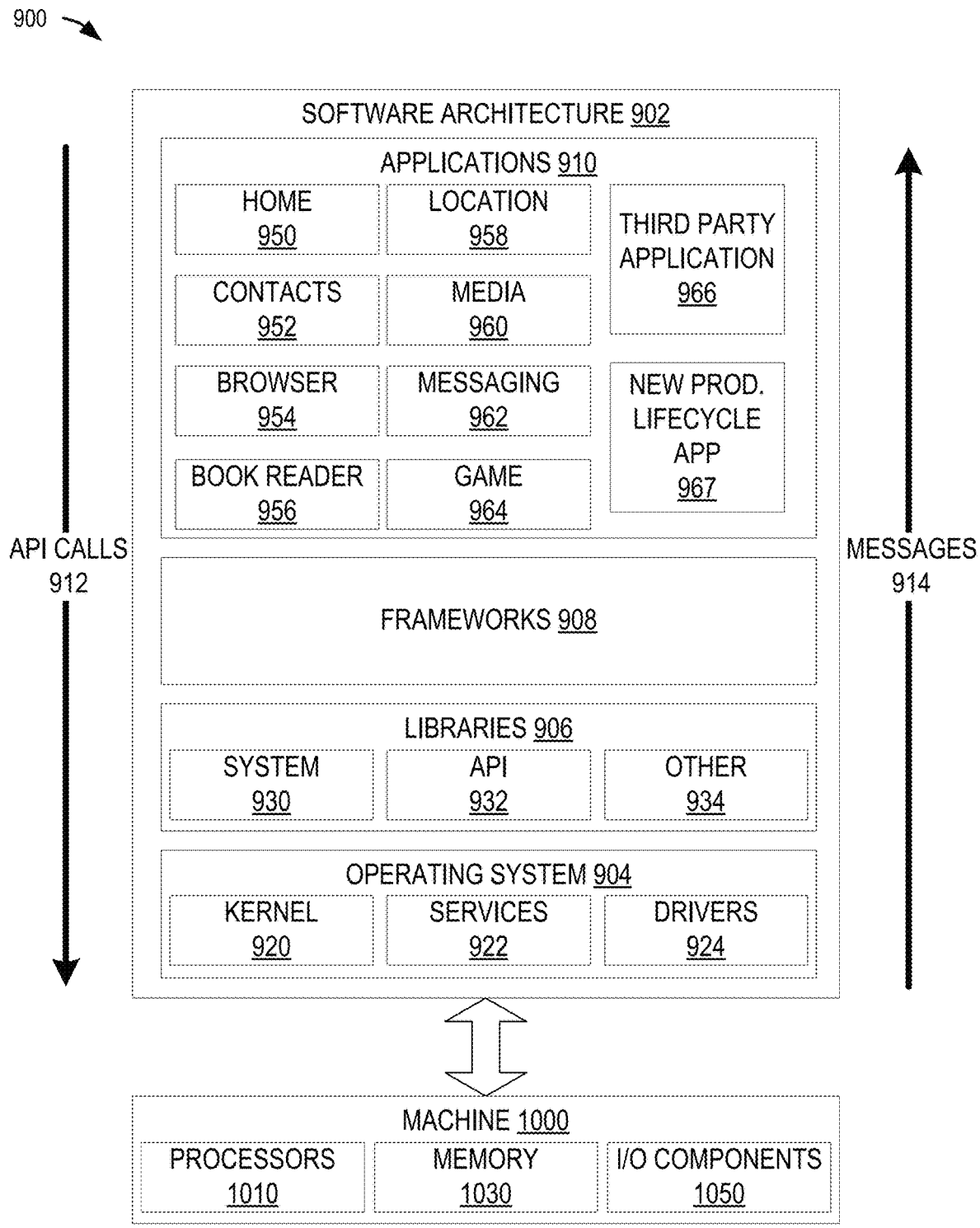
FIG. 9 is a block diagram illustrating an example of a software architecture that may be installed on a machine, according to some example embodiments.

FIG. 9 is a block diagram 900 illustrating software architecture 902, which can be installed on any one or more of the devices described above. For example, in various embodiments, client devices 110 and servers and systems 130, 102, 120, 122, and 124 may be implemented using some or all of the elements of software architecture 902. FIG. 9 is merely a non-limiting example of a software architecture, and it will be appreciated that many other architectures can be implemented to facilitate the functionality described herein. In various embodiments, the software architecture 902 is implemented by hardware such as machine 1000 of FIG. 10 that includes processors 1010, memory 1030, and I/O components 1050. In this example, the software architecture 902 can be conceptualized as a stack of layers where each layer may provide a particular functionality. For example, the software architecture 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications, such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 966 can invoke the API calls 912 provided by the operating system 904 to facilitate functionality described herein.

Some embodiments may particularly include new product lifecycle application 967. In certain embodiments, this may be a stand-alone application that operates to manage communications with a server system such as third-party servers 130 or server system 102. In other embodiments, this functionality may be integrated with another application. The new product lifecycle application 967 may request and display various data related to dynamic file generation for new product forecasting and may provide the capability for a user 106 to input data related to the objects via a touch interface, keyboard, or using a camera device of machine 1000, communication with a server system via I/O components 1050, and receipt and storage of object data in memory 1030. Presentation of information and user inputs associated with the information may be managed by new product lifecycle application 967 using different frameworks 908, library 906 elements, or operating system 904 elements operating on a machine 1000.

Figure 10:
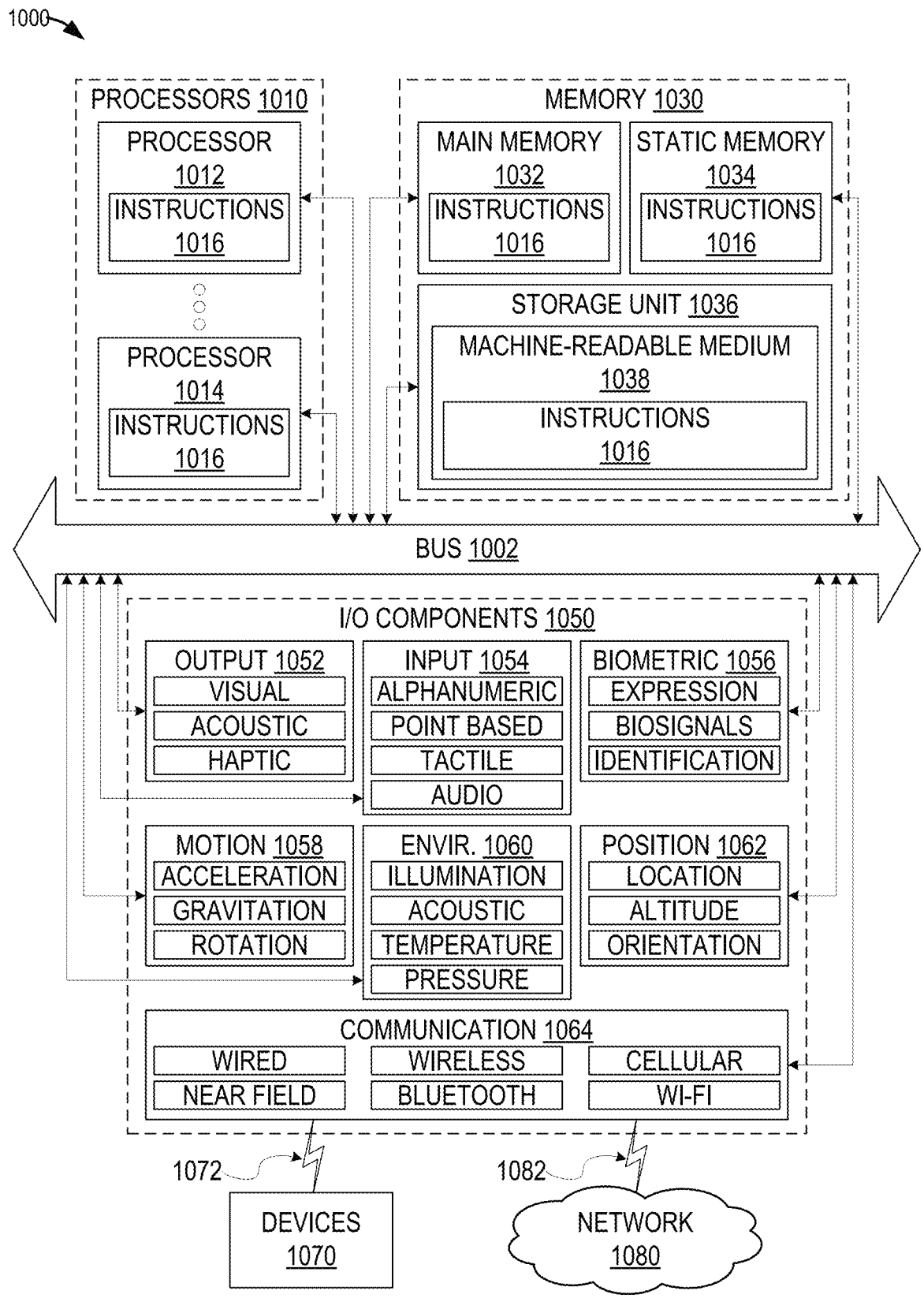
FIG. 10 illustrates a diagrammatic representation of a machine, in the form of a computer system, within which a set of instructions may be executed for causing the machine to perform any one or more of the methodologies discussed herein, according to an example embodiment.

FIG. 10 is a block diagram illustrating components of a machine 1000, according to some embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application 910, an applet, an app, or other executable code) for causing the machine 1000 to perform any one or more of the methodologies discussed herein can be executed. In alternative embodiments, the machine 1000 operates as a standalone device or can be coupled (e.g., networked) to other machines. In a networked deployment, the machine 1000 may operate in the capacity of a server machine 130, 102, 120, 122, 124, etc., or a client device 110 in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1012 and a processor 1014 that may execute the instructions 1016. The term "processor" is intended to include multi-core processors 1010 that may comprise two or more independent processors 1012, 1014 (also referred to as "cores") that can execute instructions 1016 contemporaneously. Although FIG. 10 shows multiple processors 1010, the machine 1000 may include a single processor 1010 with a single core, a single processor 1010 with multiple cores (e.g., a multi-core processor 1010), multiple processors 1012, 1014 with a single core, multiple processors 1012, 1014 with multiples cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any one or more of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown, in an example embodiment, to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions 1016, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, communication components 1064 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1070 may be another machine 1000 or any of a wide variety of peripheral devices (e.g., a peripheral device coupled via a Universal Serial Bus (USB)).

Moreover, in some embodiments, the communication components 1064 detect identifiers or include components operable to detect identifiers. For example, the communication components 1064 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1038 is non-transitory (in other words, not having any transitory signals) in that it does not embody a propagating signal. However, labeling the machine-readable medium 1038 "non-transitory" should not be construed to mean that the medium is incapable of movement; the medium 1038 should be considered as being transportable from one physical location to another. Additionally, since the machine-readable medium 1038 is tangible, the medium 1038 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
receiving, by one or more processors, a request, via a user selection in a graphical user interface (GUI) displayed on a computing device, for forecasting data for a new product that has no historical data, the request comprising identification of a product type or product line corresponding to the new product indicated by user input or selection via the GUI;
dynamically generating, by the one or more processors, the forecasting data for the new product that has no historical data by performing operations comprising:
generating a list of a plurality of existing products for the identified product type or product line;
accessing data for a plurality of existing phase-in and phase-out curves corresponding to the plurality of existing products, each existing phase-in and phase-out curve of the plurality of existing phase-in and phase-out curves comprising at least one value corresponding to planning data for a respective existing product;
determining that a subset of existing phase-in and phase-out curves of the plurality of existing phase-in and phase-out curves comprises more than one value corresponding to respective planning data for the respective existing product;
based on determining that the subset of existing phase-in and phase-out curves of the plurality of existing phase-in and phase-out curves comprises more than one value corresponding to the respective planning data for the respective existing product, analyzing each value for each existing phase-in and phase-out curve of the subset of existing phase-in and phase-out curves to determine a number of values for each existing phase-in and phase-out curve;

determining an existing phase-in and phase-out curve, of the subset of existing phase-in and phase-out curves, with a maximum number of values;
generating a text file comprising a number of value columns corresponding to the maximum number of values;
extracting data for each existing phase-in and phase out curve of the subset of existing phase-in and phase-out curves, the extracted data comprising a type of curve, a start value, an end value, a function for the phase-in or phase-out curve, and a number of values for the phase-in or phase-out curve; and
populating the text file with the extracted data for each existing phase-in and phase-out curve of the subset of existing phase-in and phase-out curves; and
providing the dynamically generated forecasting data comprising the populated text file to the computing device, wherein the one or more processors adjusts a displayable version of the populated text file to be displayed in the GUI of the computing device based on a determination of a discrepancy between a structure of the populated text file and paging requirements of the computing device by shortening the populated text file to fit in a page on the GUI so that all value columns and rows are not shown.

2. The computer-implemented method of claim 1, wherein the GUI enables editing of the populated text file.

3. The computer-implemented method of claim 2, further comprising:
receiving, from the computing device, edits made to the text file;
saving the text file comprising the edits in a data store as forecasting data for the new product.

4. The computer-implemented method of claim 3, wherein the edits comprise changes made to one or more values in the subset of curves.

5. The computer-implemented method of claim 3, wherein the edits comprise addition of at least one new curve to the plurality of existing phase-in and phase-out curves.

6. The computer-implemented method of claim 1, further comprising:
receiving a second request from the computing device for reference existing product data to use for the new product, the second request comprising an indication of a plurality of existing products and at least one of a weight, a start date, or an end date for each existing product of the plurality of existing products;
accessing the data for the plurality of existing products;
extracting, for each existing product, reference data from the data for the plurality of existing products, based on at least one of the specified weight, start date, or end date;
generating a text file for the reference data and populating the generated text file with the reference data and any specified weight, start date, and end date; and
providing the populated text file to the computing device.

7. The computer-implemented method of claim 1, wherein the populated text file is a character separated text file.

8. The computer-implemented method of claim 7, wherein the character is a comma, a semi-colon, or a colon.

9. The computer-implemented method of claim 1,
receiving a second request for forecasting data for a second new product that has no historical data, the request comprising identification of a second product type or product line corresponding to the new product;
generating a second list of a second plurality of existing products for the second identified product type or product line;
accessing second data comprising existing curves corresponding to the second plurality of existing products, and determining that the second data only comprises functions that do not comprise any values;
extracting the second data and populating a second text file with the extracted second data; and
providing the second populated text file to the computing device, wherein more information is included in the second text file than is displayed on a display of the computing device.

10. The computer-implemented method of claim 9, wherein the functions include at least one linear function.

11. A system comprising:
a memory that stores instructions; and
one or more processors configured by the instructions to perform operations comprising:
receiving a request, via a user selection in a graphical user interface (GUI) displayed on a computing device, for forecasting data for a new product that has no historical data, the request comprising identification of a product type or product line corresponding to the new product indicated by user input or selection via the GUI;
dynamically generating the forecasting data for the new product that has no historical data by performing operations comprising:
generating a list of a plurality of existing products for the identified product type or product line;
accessing data for a plurality of existing phase-in and phase-out curves corresponding to the plurality of existing products, each existing phase-in and phase-out curve of the plurality of existing phase-in and phase-out curves comprising at least one value corresponding to planning data for a respective existing product;
determining that a subset of existing phase-in and phase-out curves of the plurality of existing phase-in and phase-out curves comprises more than one value corresponding to respective planning data for the respective existing product;
based on determining that the subset of existing phase-in and phase-out curves of the plurality of existing phase-in and phase-out curves comprises more than one value corresponding to the respective planning data for the respective existing product, analyzing each value for each existing phase-in and phase-out curve of the subset of existing phase-in and phase-out curves to determine a number of values for each existing phase-in and phase-out curve;
determining an existing phase-in and phase-out curve, of the subset of existing phase-in and phase-out curves, with a maximum number of values;
generating a text file comprising a number of value columns corresponding to the maximum number of values;
extracting data for each existing phase-in and phase out curve of the subset of existing phase-in and phase-out curves, the extracted data comprising a type of curve, a start value, an end value, a function for the phase-in or phase-out curve, and a number of values for the phase-in or phase-out curve; and
populating the text file with the extracted data for each existing phase-in and phase-out curve of the subset of existing phase-in and phase-out curves; and providing the dynamically generated forecasting data comprising the populated text file to the computing device, wherein the one or more processors adjusts a displayable version of the populated text file to be displayed in the GUI of the computing device based on a determination of a discrepancy between a structure of the populated text file and paging requirements of the computing device by shortening the populated text file to fit in a page on the GUI so that all value columns and rows are not shown.

12. The system of claim 11, wherein the GUI enables editing of the populated text file.

13. The system of claim 12, the operations further comprising:
receiving, from the computing device, edits made to the text file;
saving the text file comprising the edits in a data store as forecasting data for the new product.

14. The system of claim 13, wherein the edits comprise changes made to one or more values in the subset of curves.

15. The system of claim 13, wherein the edits comprise addition of at least one new curve to the plurality of existing phase-in and phase-out curves.

16. The system of claim 11, the operations further comprising:
receiving a second request from the computing device for reference existing product data to use for the new product, the second request comprising an indication of a plurality of existing products and at least one of a weight, a start date, or an end date for each existing product of the plurality of existing products;
accessing the data for the plurality of existing products;
extracting, for each existing product, reference data from the data for the plurality of existing products, based on at least one of the specified weight, start date, or end date;
generating a text file for the reference data and populating the generated text file with the reference data and any specified weight, start date, and end date; and
providing the populated text file to the computing device.

17. The system of claim 11, wherein the populated text file is a character separated text file.

18. The system of claim 17, wherein the character is a comma, a semi-colon, or a colon.

19. A non-transitory computer-readable medium comprising instructions stored thereon that are executable by at least one processor to cause a computing device to perform operations comprising:
receiving a request, via a user selection in a graphical user interface (GUI) displayed on a computing device, for forecasting data for a new product that has no historical data, the request comprising identification of a product type or product line corresponding to the new product indicated by user input or selection via the GUI;
dynamically generating the forecasting data for the new product that has no historical data by performing operations comprising:
generating a list of a plurality of existing products for the identified product type or product line;
accessing data for a plurality of existing phase-in and phase-out curves corresponding to the plurality of existing products, each existing phase-in and phase-out curve of the plurality of existing phase-in and phase-out curves comprising at least one value corresponding to planning data for a respective existing product;
determining that a subset of existing phase-in and phase-out curves of the plurality of existing phase-in and phase-out curves comprises more than one value corresponding to respective planning data for the respective existing product;
based on determining that the subset of existing phase-in and phase-out curves of the plurality of existing phase-in and phase-out curves comprises more than one value corresponding to the respective planning data for the respective existing product, analyzing each value for each existing phase-in and phase-out curve of the subset of existing phase-in and phase-out curves to determine a number of values for each existing phase-in and phase-out curve;
determining an existing phase-in and phase-out curve, of the subset of existing phase-in and phase-out curves, with a maximum number of values;
generating a text file comprising a number of value columns corresponding to the maximum number of values;
extracting data for each existing phase-in and phase out curve of the subset of existing phase-in and phase-out curves, the extracted data comprising a type of curve, a start value, an end value, a function for the phase-in or phase-out curve, and a number of values for the phase-in or phase-out curve; and
populating the text file with the extracted data for each existing phase-in and phase-out curve of the subset of existing phase-in and phase-out curves; and
providing the dynamically generated forecasting data comprising the populated text file to the computing device, wherein at least one processor adjusts a displayable version of the populated text file to be displayed in the GUI of the computing device based on a determination of a discrepancy between a structure of the populated text file and paging requirements of the computing device by shortening the populated text file to fit in a page on the GUI so that all value columns and rows are not shown.

20. The non-transitory computer-readable medium of claim 19, the operations further comprising:
receiving a second request from the computing device for reference existing product data to use for the new product, the second request comprising an indication of a plurality of existing products and at least one of a weight, a start date, or an end date for each existing product of the plurality of existing products;
accessing the data for the plurality of existing products;
extracting, for each existing product, reference data from the data for the plurality of existing products, based on at least one of the specified weight, start date, or end date;
generating a text file for the reference data and populating the generated text file with the reference data and any specified weight, start date, and end date; and
providing the populated text file to the computing device.

* * * * *